United States Patent [19]

Batha et al.

[11] 4,076,692
[45] Feb. 28, 1978

[54] PROCESS FOR MANUFACTURING NOVALOID FIBER

[75] Inventors: Howard Dean Batha; Glenn John Hazelet, both of Tonawanda, N.Y.

[73] Assignee: American Kynol, Inc., Altamonte Springs, Fla.

[21] Appl. No.: 705,383

[22] Filed: Jul. 15, 1976

[51] Int. Cl.$^2$ ............................................. C08G 8/28
[52] U.S. Cl. ............................. 260/59 R; 264/331; 264/176 F
[58] Field of Search .................... 260/59 R, 176 F

[56] References Cited
U.S. PATENT DOCUMENTS

| | | | |
|---|---|---|---|
| 3,650,102 | 3/1972 | Economy et al. | 260/59 X |
| 3,651,199 | 3/1972 | Blume et al. | 260/59 X |
| 3,848,044 | 11/1974 | Hagiwara et al. | 260/59 X |
| 3,903,220 | 9/1975 | Economy et al. | 260/59 X |
| 3,931,386 | 1/1976 | Kimura et al. | 264/176 F |
| 3,972,959 | 8/1976 | Koyama | 260/59 X |

*Primary Examiner*—Howard E. Schain
*Attorney, Agent, or Firm*—David E. Dougherty; Raymond W. Green; Michael L. Dunn

[57] ABSTRACT

A cured novoloid fiber and the process for its manufacture which comprises blending a crosslinking agent with a novolac resin at a temperature below about 40° C, rapidly melting the blend, fiberizing the melted blend before it can cure and curing the resulting fibers by exposing them to an acidic gas.

12 Claims, No Drawings

PROCESS FOR MANUFACTURING NOVALOID FIBER

BACKGROUND OF THE INVENTION

A. Field of the Invention

This invention relates to cured fibers and more particularly relates to a process for the manufacture of a fiber containing at least 85% by weight of a cross-linked novolac i.e. novoloid, and the fiber resulting from the process.

B. History of the Prior Art

In the prior art phenolic resin fibers were manufactured by fiberizing uncured phenolic resins. The uncured fibers were then cured by heating them in an environment containing a cross-linking agent and a catalyst.

This method of manufacturing phenolic resin fibers is undesirable since the process time is extensive, generally running from 6 to 16 hours from the time the process begins until the cured phenolic resin fiber is obtained.

In addition, manufacturing phenolic resin fibers by this method, even after extended curing time, frequently does not result in a completely cured fiber since cure of the inside of the fiber is dependent upon diffusion of cross-linking agent and catalyst through the exterior of the fiber.

It is most desirable to manufacture phenolic resin fibers beginning with novolac phenolic resins, i.e. those phenolic resins manufactured from phenol and formaldehyde wherein excess phenol is used. The novolac resins are preferred due to their ease of manufacture and control and in addition, it is somewhat easier to cure novolac resins in the fiber form. Furthermore, it is easier to control the extent of curing and cross-linking of novolac in fiber form than the curing of other types of phenolic resins in fiber form. In particular, the resols, i.e. those phenol-formaldehyde resins wherein excess formaldehyde is used, are most difficult to control during manufacture and are more difficult to cure and control when fibers are being formed. Furthermore, it is more difficult to obtain thermoplastic resols which can be subsequently melted to form fibers.

In the prior art attempts to obtain novoloid fibers by fiberizing a melted blend of a novolac resin and a cross-linking agent were unsuccessful since curing occurred which interferred with the fiberizing process.

BRIEF DESCRIPTION OF THE INVENTION

This invention is a process for forming a cured novoloid fiber which comprises blending uncured novolac resin with from about 3 to about 12 weight percent of a novolac cross-linking agent desirably selected from the group consisting of hexamethylenetetramine and paraformaldehyde, at a temperature below the curing temperature of the resulting blend. The process further comprises melting a portion of the resulting blend at a temperature of from about 125 to 500° C; fiberizing the melted portion before the melted portion cures to an extent which prevents such fiberizing, and curing the resulting uncured fibers by contacting them with acidic gas at from about 20° to about 300° C and from about 1 to about 10 atmospheres of pressure until the desired degree of curing is obtained.

The invention further comprises the novel cured novoloid fiber manufactured in accordance with the foregoing process. The preferred novolac resin used in accordance with the process is a reaction product of phenol and formaldehyde.

DETAILED DESCRIPTION OF THE INVENTION

"Novolac" as used herein is a thermoplastic resin manufactured from a phenol and an aldehyde by the use of acid catalyst and excess phenol. The novolacs may be reacted with a cross-linking agent such as hexamethylenetetramine or paraformaldehyde to obtain a cured cross-linked structure or a novoloid.

The phenol used may be simple phenol or another phenolic compound such as o-cresol, blends of $m$ and p-cresols, p-tert-butylphenol, p-phenylphenol and cardanol. Other such phenols include 3,5-xylenol, 2,4-xylenol, 3,4-xylenol and 2,5-xylenol. By far the most desirable aldehyde is formaldehyde although other aldehydes are suitable such as acetaldehyde and butyraldehyde. Aromatic aldehydes such furfural can also be used.

By far the most desirable from a commercial standpoint, due to its ease of formation and availability, is a novolac formed from phenol and formaldehyde wherein excess phenol is used.

Cross-linking agents which may be used in conjunction with the uncured novolac to form a novoloid are hexamethylenetetramine (hexa), paraformaldehyde and cyclic formals including dioxolanes and dioxanes. Examples of such dioxanes and dioxolanes are 1,3-dioxane; 4-phenyl-1,3-dioxolane and 4-methyl-1,3-dioxolane. By far the most desirable cross-linking agents are hexa and paraformaldehyde with the most desirable cross-linking agent being hexa.

Those novolac resins which are particularly suitable for use in accordance with the invention have a melting point between about 90° and 105° C, a density of from about 0.3 to about 0.35 gms per cc, a tensile strength of between about 80 and 125 Kg/sq. cm. and an average particle size of smaller than 200 mesh. The novolac resin may be a direct reaction product of phenol and formaldehyde wherein excess phenol is used or the resin may include some modification such as is obtained by modifying the resin with aniline.

The blending of the uncured novolac resin with the cross-linking agent can be done in any commercial blending apparatus such as a ball mill. The percent of cross-linking agent present when the cross-linking agent is hexamethylenetetramine is preferably between about 6.5 and 10 weight percent. When the cross-linking agent is paraformaldehyde, it is preferably present in an amount of between about 4 and 8 weight percent. The blending temperature is preferably maintained between 0 and 40° C and is most preferably below 30° C to prevent undesirable premature curing of the resin prior to fiberizing. Uncured novolac resin as used herein means a novolac resin which retains thermoplastic properties.

The resin which is to be fiberized is melted just prior to the fiberizing operation, that is, the time between melting and fiberizing is generally from about 1 to about 15 seconds. The quick fiberizing occurs in order to avoid premature curing which could prevent the fiberizing operation by creating a thermosetting resin which cannot be subsequently formed into fibers. The melting of the resin obviously occurs at a temperature above its melting point. The most desirable melting temperature is however substantially above the melting point and is generally at least 125° C and is preferably at least about 200° C. An upper limitation on the temperature used to melt the blend is the decomposition temperature of the resin; therefore the upper temperature limit usually does not exceed 500° C. The most desirable upper limit on melting temperature is about 400° C. The melting temperature range is preferrably between about 200 and 500° C and is most preferrably between about 200 and 400° C.

The melted resin can be fiberized by any suitable means including rapidly extruding the resin through a heated die, centrifugally spinning fibers from the melted resin and blowing fibers from the melted resin with a compressed gas such as compressed air. A particularly suitable method is by centrifugally forcing resin particles blended with cross-linking agent to orifices in a cylinder which is heated sufficiently to rapidly melt the resin. The cylinder is rotated at sufficient speed to cause fibers to be pulled through the orifices by centrifugal force.

After the fibers are formed, they are cured by contacting them with an acidic gas at from about 20 to about 300° C and at from about 1 to about 10 atmospheres of pressure. The acidic gas may either be the gas of a conventional hydrogen containing acid or a Lewis Acid. Suitable hydrogen containing acids are the mineral acids. The most desirable mineral acids are the hydrogen halides of which HCl is particularly suitable. A particularly desired Lewis Acid for use in conjunction with the invention is $BF_3$. While the curing temperature may be low, i.e. 20° C or high, i.e. 300° C, the most desirable curing temperature is between about 100 and 250° C so that a rapid complete cure is obtained in minimal time while decomposition and undesirable melting of the resin is avoided.

If the resulting fibers are heated in the absence of the acidic gas, the fibers will melt before they cure and an unacceptable product is obtained; however, the melting of the fibers in the absence of acidic gas can be advantageously used to form a fused fiber mat by forming a mat of uncured fibers and heating the mat to above the melting point of the fibers so that the fibers fuse to each other whereupon the mat is immediately exposed to an acidic gas to prevent further melting while the fibers are cured. The result is a fuse bonded mat which is useful in numerous applications including insulation and filters. The curing time for complete cure of the fibers whether individually or in mat form by the acidic gas is less than 10 minutes and usually less than 5 minutes.

The fibers resulting in accordance with the process of the invention possess a number of highly desirable properties. In particular, the resulting fibers are heat and flame resistant, have substantial tensile strength, e.g. in excess of about 1,000 kg. per sq. cm., and are essentially inert to many acids and organic solvents. The fibers may be used in the manufacture of cloth, filters, and insulation.

EXAMPLES

EXAMPLE 1

A novolac resin having an average particle size smaller than 200 mesh is blended with about 9 percent of hexamethylenetetramine. The blend is then pressed to form a solid block of resin. A stream of air at a temperature about 350° F. is blown over the edge of the block. The impinging air melts the surface of the block and blows fibers directly off the solid resin

EXAMPLE 2

Blown fibers from Example 1 are charged into a two-liter kettle and are heated from 27 to 180° C over a period of 10 minutes in the presence of 100 percent $BF_3$ gas at a pressure of one atmosphere. The resulting fibers are completely cured after the expiration of the 10 minute time period.

EXAMPLE 3

Fibers from Example 1 are introduced into the kettle in accordance with Example 2 and are heated from 34° C to 190° C over a time period of 9 minutes in the presence of hydrogen chloride gas. The resulting fibers are completely cured after the expiration of 9 minutes and are somewhat lighter in color than the fibers cured with $BF_3$.

EXAMPLE 4

The fibers formed in accordance with Example 1 are heated in a kettle at a temperature ranging from 30° C to 77° C over a period of 3 minutes. The fibers soften and melt in the absence of the acid gas.

EXAMPLE 5

A novolac resin powder having an average particle size of smaller than 200 mesh, a melting point of 95 to 105° C, and a density of from 0.30 to 0.35 gm per cc. is introduced into a cotton candy machine wherein the resin particles are centrifugally forced to a slotted rotating cylinder which is sufficiently heated with a band heater to instantly melt the resin powder. The centrifugal force of the machine then causes the resin to be fiberized. The resulting fibers are cured in accordance with the procedure of Examples 2, 3, and 4 with similar results

EXAMPLE 6

The procedure of Example 5 is repeated except about 5 percent by weight of paraformaldehyde is used. The resulting fibers are cured in accordance with the procedure of Example 2 to obtain cured novoloid fibers.

Examination of the foregoing examples clearly shows that novoloid fibers can be rapidly prepared from a blend of a novolac resin with a cross-linking agent provided that melting of the blend occurs simultaneously with or immediately prior to fiberization. In accordance with this invention, novoloid fibers can be obtained in less than 10 minutes whereas prior art methods required times measured in hours to obtain the final cured novoloid fiber. In addition, the fibers manufactured in accordance with the process of this invention are evenly cured through the fiber thus obtaining increased heat resistance, strength and uniformity.

What is claimed is:

1. A process for forming cured novoloid fibers comprising:
    a. blending uncured novolac resin with from about 3 to about 12 weight percent of a novolac cross-linking agent selected from the group consisting of hexamethylenetetramine and paraformaldehyde at a temperature below the curing temperature of the resulting blend;
    b. melting the resulting blend at a temperature of from about 125 to about 500° C;
    c. fiberizing said melted blend before it cures to an extent which prevents such fiberizing; and d. curing the resulting uncured fibers by contacting them with an acidic gas at from about 20° to about 300° C and from about 1 to about 10 atmospheres of pressure for a curing time to obtain the desired degree of curing.

2. The process of claim 1 wherein the blending temperature is from about 0° to about 40° C.

3. The process of claim 2 wherein said melting temperature is between about 200° and 400° C.

4. The process of claim 3 wherein the uncured novolac resin is a reaction product of phenol and formaldehyde.

5. The process of claim 4 wherein resin particles blended with the cross-linking agent are centrifugally forced to orifices in a cylinder which is heated sufficiently to rapidly melt the resin, said cylinder being rotated with sufficient speed to cause fibers to be pulled through the orifices by centrifugal force.

6. The process of claim 4 wherein said acidic gas is a hydrogen halide.

7. The process of claim 6 wherein said acidic gas is hydrogen chloride.

8. The process of claim 4 wherein said acidic gas is the vapor of a Lewis Acid.

9. The process of claim 8 wherein said Lewis Acid is boron trifluoride.

10. The process of claim 4 wherein the cross-linking agent is hexamethylenetetramine.

11. The process of claim 4 wherein prior to said curing a mat of uncured fibers is heated sufficiently to fuse the fibers to each other and insufficiently to melt said mat.

12. The process of claim 1 wherein said melted blend is fiberized within from about 1 to about 15 seconds from the time said blend is melted and the curing time is less than 10 minutes.

* * * * *